C. L. ANGLE.
OIL CAN.
APPLICATION FILED FEB. 19, 1912.
1,046,713.
Patented Dec. 10, 1912.
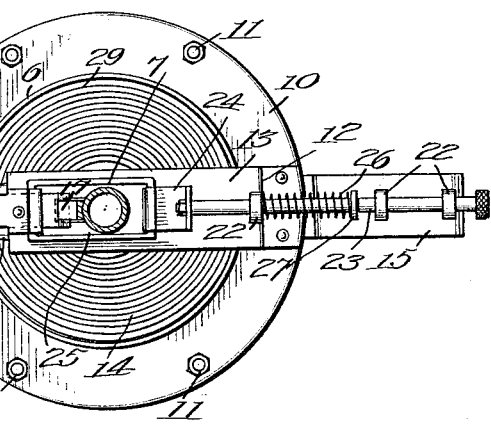
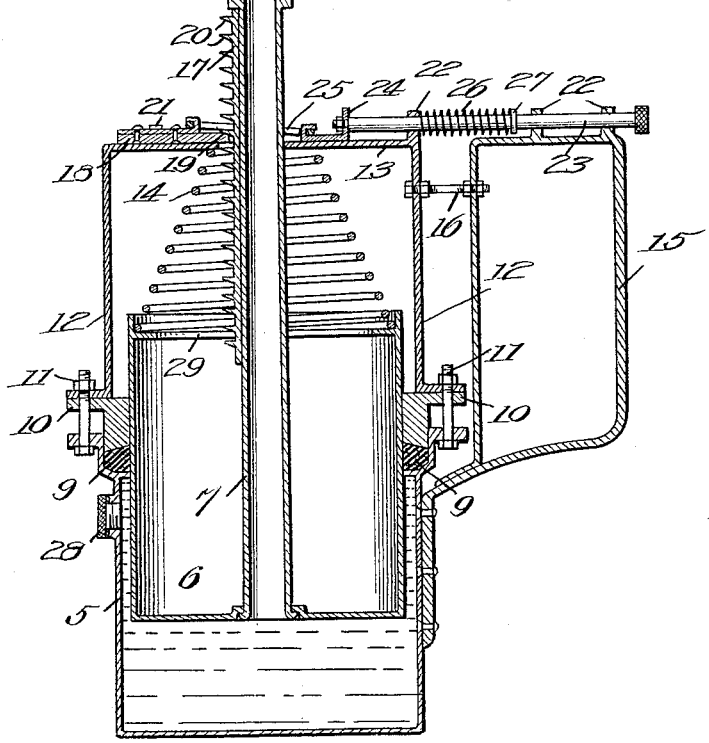
WITNESSES
INVENTOR
Charles L. Angle
Attorneys

UNITED STATES PATENT OFFICE.

CHARLES L. ANGLE, OF LAWRENCEVILLE, ILLINOIS.

OIL-CAN.

1,046,713. Specification of Letters Patent. Patented Dec. 10, 1912.

Application filed February 19, 1912. Serial No. 678,533.

*To all whom it may concern:*

Be it known that I, CHARLES L. ANGLE, a citizen of the United States, residing at Lawrenceville, in the county of Lawrence and State of Illinois, have invented certain new and useful Improvements in Oil-Cans, of which the following is a specification.

This invention relates to hand oil-cans which are used for oiling machinery, and the object of the invention is to provide an oil-can which will deliver heavy or light grade, hot or cold oil regardless of the position in which it is held, this being effected by the release of a spring-pressed plunger which causes the oil to discharge from the can through a spout conveniently arranged for that purpose, the oil continuing to flow until the travel of the plunger is arrested.

In order that the invention may be better understood, reference is had to the accompanying drawing, in which—

Figure 1 is vertical sectional view of the can and the discharge mechanism, and Fig. 2 is a plan view thereof.

Referring specifically to the drawing, 5 denotes a can or other suitable reservoir which holds the supply of oil. The can is, preferably, cylindrical, and in it works a spring-pressed plunger 6 for discharging the oil. The plunger carries a spout 7 which passes centrally therethrough and opens through the inner end of the plunger so that the oil may pass into the spout as the plunger is advanced. The outer end of the spout is supplied with a suitable nozzle 8 which screws thereon. The plunger passes into the can through a stuffing box 9 on the top of the latter, said stuffing box being provided with a gland 10 which is secured by bolts 11. From the gland 10 rise posts 12 which are connected at the top by a cross-bar 13, thus forming a yoke. The cross-bar has an opening through which the spout 7 passes. Between the cross-bar and the top of the plunger 6 is interposed a spring 14, the latter being coiled around the spout, which projects a suitable distance from the end of the plunger. This spring operates the plunger to force the oil out of the can as will be presently described. To the side of the can is fastened a handle 15 which is braced by means of a bolt 16 connecting the same with one of the posts 12. To the outside of the projecting upper end of the spout 7 is secured a rack bar 17 extending lengthwise thereof, and on top of the cross-bar is mounted a latch dog 18 which is adapted to coöperate with the rack bar to lock the plunger 6. The edge of the latch which engages the teeth of the rack bar is beveled, as indicated at 19, and the under side of the rack teeth is also beveled, as indicated at 20, so that when these two surfaces come together a wedging action takes place, and the plunger is moved outwardly a short distance, which tends to create a vacuum in the can and thus causes the flow of oil therefrom to be stopped instantly. The latch 18 slides transversely of the rack bar and spout, so that the edge 19 may be disengaged from the rack bar to release the plunger, and reëngaged therewith to stop the plunger and shut off the flow of oil from the can. On the cross-bar 13 are guides 21 under which the latch works. On the top of the handle 15 and on the cross-bar 13 are bearings 22 in which is slidably mounted a latch-operating stem 23 having connected to one of its ends a slide 24 which works on top of the cross-bar 13 and is connected by a link 25 to the latch 18, said link straddling the spout and rack bar so as not to interfere with the free movement thereof. The stem 23 is spring-operated, a spring 26 being coiled around the same between an abutment 27 thereon and one of the bearings 22.

It will be evident from the foregoing that the latch 18 is disengaged from the rack bar 17 upon pressing the stem 23 inward against the tension of the spring 26, whereupon the plunger 6 is released and forced inward by the spring 14 to discharge the oil from the can. When the stem is released it is retracted by the spring 26, whereupon the latch immediately locks the plunger and the flow of oil is shut off at once. The spring 14 forces the plunger 6 downward into the can until the bottom of the latter is reached, after which the plunger may be retracted and the can refilled, a filling plug 28 being provided, which is fitted to the side of the can, near the top thereof.

The plunger may be a hollow cylinder, as shown, closed at the bottom and having at the top a seat 29 for the spring 14.

The preferred embodiment of the invention has been shown but it is to be noted that various changes in the structural details may be made without a departure from the spirit and scope of the invention.

I claim:

1. The combination with a reservoir, of a plunger working therein, a spout carried by the plunger and opening through the inner end thereof into the reservoir, the other end of the spout projecting from the outer end of the plunger, a spring for actuating the plunger, a rack bar carried by the projecting end of the spout, a latch engageable with the rack bar, a spring-actuated stem, and a link straddling the projecting end of the spout and the rack bar and connected to the latch and the stem.

2. The combination with a reservoir, of a plunger working therein, a spout carried by the plunger and opening through the inner end thereof into the reservoir, the other end of the spout projecting from the outer end of the plunger, a spring for actuating the plunger, a yoke carried by the can, between which yoke and the plunger the spring is interposed, a rack on the side of the projecting end of the spout, a latch slidably mounted on the yoke and engageable with the rack-bar, and means for releasing the latch.

3. The combination with a reservoir, of a plunger working therein, a spout carried by the plunger and opening through the inner end thereof into the reservoir, the other end of the spout projecting from the outer end of the plunger, a spring for actuating the plunger, a yoke carried by the can, between which yoke and the plunger the spring is interposed, a rack on the side of the projecting end of the spout, a latch slidably mounted on the yoke and engageable with the rack-bar, a spring-actuated stem, and a link straddling the projecting end of the spout and the rack bar and connected to the latch and the stem.

4. The combination with a reservoir, of a spring-actuated plunger working therein for discharging the contents of the reservoir, a rack-bar carried by the plunger, and a latch engageable with the rack-bar for locking the plunger, the engaging surfaces of the latch and the rack-bar being beveled to impart a movement to the plunger in the direction opposite to that in which it is moved by its actuating-spring.

In testimony whereof I affix my signature in presence of two witnesses.

CHARLES L. ANGLE.

Witnesses:
J. M. GROFF,
J. W. VONDENARK.

---

Copies of this patent may be obtained for five cents each, by addressing the "Commissioner of Patents, Washington, D. C."